United States Patent
Hurry

(10) Patent No.: US 9,702,412 B2
(45) Date of Patent: Jul. 11, 2017

(54) DECOUPLER CLUTCH ENGAGEMENT SURFACE WITH SELECTED SURFACE FINISH

(71) Applicant: LITENS AUTOMOTIVE PARTNERSHIP, Woodbridge (CA)

(72) Inventor: Evan J. Hurry, Holland Landing (CA)

(73) Assignee: LITENS AUTOMOTIVE PARTNERSHIP, Woodbridge, ON (CA)

( * ) Notice: Subject to any disclaimer, the term of this patent is extended or adjusted under 35 U.S.C. 154(b) by 15 days.

(21) Appl. No.: 14/896,874

(22) PCT Filed: Aug. 19, 2014

(86) PCT No.: PCT/CA2014/000631
§ 371 (c)(1),
(2) Date: Dec. 8, 2015

(87) PCT Pub. No.: WO2015/024101
PCT Pub. Date: Feb. 26, 2015

(65) Prior Publication Data
US 2016/0131197 A1  May 12, 2016

Related U.S. Application Data

(60) Provisional application No. 61/867,262, filed on Aug. 19, 2013.

(51) Int. Cl.
*F16D 13/08*  (2006.01)
*F16D 13/12*  (2006.01)
(Continued)

(52) U.S. Cl.
CPC .............. *F16D 13/12* (2013.01); *B60K 25/02* (2013.01); *F02B 67/06* (2013.01); *F16D 7/022* (2013.01);
(Continued)

(58) Field of Classification Search
CPC .......... F16D 13/08; F16D 13/12; F16D 13/74; F16D 13/76; F16D 41/206; F16D 2300/10; F16H 55/36; F16H 2055/366
See application file for complete search history.

(56) References Cited

U.S. PATENT DOCUMENTS

2011/0224038 A1* 9/2011 Aantchak .............. F16D 41/206
474/94

FOREIGN PATENT DOCUMENTS

EP    1943439 A0   5/2007
EP    2080922 A1   7/2009
(Continued)

OTHER PUBLICATIONS

NASA Technical Note D-7803: Optimization of Self-Acting Herringbone-Groove Journal Bearings for Maximum Stability, Oct. 1, 1974, David P. Fleming, Bernard J. Hamrock (NASA).
(Continued)

*Primary Examiner* — Richard Lorence
(74) *Attorney, Agent, or Firm* — Millman IP Inc.

(57) ABSTRACT

In an aspect, the invention is directed to a clutched device that includes a clutch input member, a clutch output member, and a wrap spring clutch. The wrap spring clutch is engageable with the clutch input member and the clutch output member and has a radially outer surface and a radially inner surface. One of the radially outer and inner surfaces is engageable with a clutch engagement surface on one of the clutch input member and the clutch output member. The clutch engagement surface has a surface finish that includes a plurality of peaks and valleys, wherein the peaks engage the wrap spring clutch and each have a selected width.

20 Claims, 8 Drawing Sheets

(51) Int. Cl.
  *F16D 13/74*  (2006.01)
  *F16D 13/76*  (2006.01)
  *F16D 41/20*  (2006.01)
  *F16H 55/36*  (2006.01)
  *B60K 25/02*  (2006.01)
  *F02B 67/06*  (2006.01)
  *F16D 7/02*   (2006.01)
  *F16H 7/18*   (2006.01)

(52) U.S. Cl.
  CPC ............ *F16D 13/08* (2013.01); *F16D 13/74* (2013.01); *F16D 13/76* (2013.01); *F16D 41/206* (2013.01); *F16H 55/36* (2013.01); *F16D 2300/10* (2013.01); *F16H 7/18* (2013.01); *F16H 2055/366* (2013.01)

(56) References Cited

FOREIGN PATENT DOCUMENTS

| | | |
|---|---|---|
| EP | 2284411 A1 | 2/2011 |
| EP | 2345824 A1 | 7/2011 |
| JP | 2001165200 A | 6/2001 |
| JP | 2010100881 A | 6/2010 |
| WO | 2010054487 A1 | 5/2010 |
| WO | 2010099605 A1 | 9/2010 |
| WO | 2011147024 A1 | 12/2011 |
| WO | 2013060313 A1 | 5/2013 |

OTHER PUBLICATIONS

The Effect of Real Gas on the Properties of Herringbone Grooved Journal Bearings, Mar. 18, 2010, J. Schiffman, D. Favrat.

The Effect of Groove Texture Patterns on Piston-Ring Pack Friction, Oct. 6, 2011, S. Mezghani, I. Demirci, H. Zahouani, M. El Mansori.

The Study of Tribological Properties of Laser Textured Surface of 2024 Aluminum Alloy Under Boundary Lubrication, Jan. 26, 2012, Tianchang Hu, Litian Hu.

Influence of the Real Geometry of the Protrusions in Micro Textured Surfaces on Frictional Behaviour, Jul. 3, 2012, Reiner Wahl, Johannes Schneider, Peter Gumbsch.

A Test Rig to Assess Fluid Sealing in Vertical Hydrodynamic Journal Bearings, Aug. 15, 2012, C.C. Rondonuwu, S.H. Winto (National University of Singapore).

Written Opinion for PCT/CA2014/000631, Nov. 6, 2014, ISA.

International Search Report for PCT/CA2014/000631, Nov. 6, 2014, ISA.

Extended EP Search Report for PCT/CA2014000631 dated Mar. 29, 2017.

* cited by examiner

DECOUPLER CLUTCH ENGAGEMENT SURFACE WITH SELECTED SURFACE FINISH

CROSS-REFERENCE TO RELATED APPLICATIONS

This application claims the benefit of U.S. Provisional Patent Application No. 61/867,262, filed Aug. 19, 2013, the contents of which are incorporated by reference as if fully set forth in detail herein.

FIELD OF THE DISCLOSURE

The present disclosure relates to decouplers and more particularly to a clutch engagement surface of a decoupler that employs a wrap spring clutch.

BACKGROUND

Decouplers are known devices that are used to isolate torsional vibrations from an input member (e.g. a belt-driven pulley) to an output member (e.g. a shaft connection member), while also permitting the output member to overrun the input member when needed. Some decouplers use a wrap spring clutch to act as a one-way clutch to permit the output member to overrun the input member. The wrap spring clutch acts against a clutch engagement surface, which may be, for example, the inner surface of a pulley. Lubricant is used sometimes to help avoid the buildup of heat between the wrap spring clutch and the clutch engagement surface. While this helps increase the longevity of these components, it would be advantageous to provide a decoupler that has an increased operating life.

SUMMARY

This section provides a general summary of the disclosure, and is not a comprehensive disclosure of its full scope or all of its features.

In an aspect, the invention is directed to a clutched device that includes a clutch input member, a clutch output member, and a wrap spring clutch. The wrap spring clutch is engageable with the clutch input member and the clutch output member and has a radially outer surface and a radially inner surface. One of the radially outer and inner surfaces is engageable with a clutch engagement surface on one of the clutch input member and the clutch output member. The clutch engagement surface has a surface finish that includes a plurality of peaks and valleys, wherein the peaks engage the wrap spring clutch and each have a selected width, and a selected peak-to-peak pitch.

In a particular embodiment of the first aspect, a volume of lubricant is positioned to lubricate the wrap spring clutch and the clutch engagement surface. The peaks each have a selected width that is based at least in part on one or more properties selected from: a yield strength of a material making up the clutch engagement surface; and a working range of temperatures of the lubricant. In some instances, the material making up the clutch engagement surface may be a nitrided steel.

In another particular embodiment of the first aspect, the clutched device is a decoupler which includes a decoupler input member and a decoupler output member. The decoupler input member may be the clutch input member and may have the clutch engagement surface thereon. Alternatively, the decoupler may include a sleeve between the decoupler input member and decoupler output member and the sleeve may be the clutch input member and may have the clutch engagement surface thereon.

In another aspect, the invention is directed to a clutched device including a clutch input member, a clutch output member, and a wrap spring clutch. The wrap spring clutch is engageable with the clutch input member and the clutch output member and has a radially outer surface and a radially inner surface. One of the radially outer and inner surfaces is engageable with a clutch engagement surface on one of the clutch input member and the clutch output member. The clutch engagement surface has a surface finish that includes a plurality of peaks and valleys. The peaks engage the wrap spring clutch and each have a selected width that is between about 20 and about 300 microns.

In some embodiments of the second aspect, a volume of lubricant is positioned to lubricate the wrap spring clutch and the clutch engagement surface.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
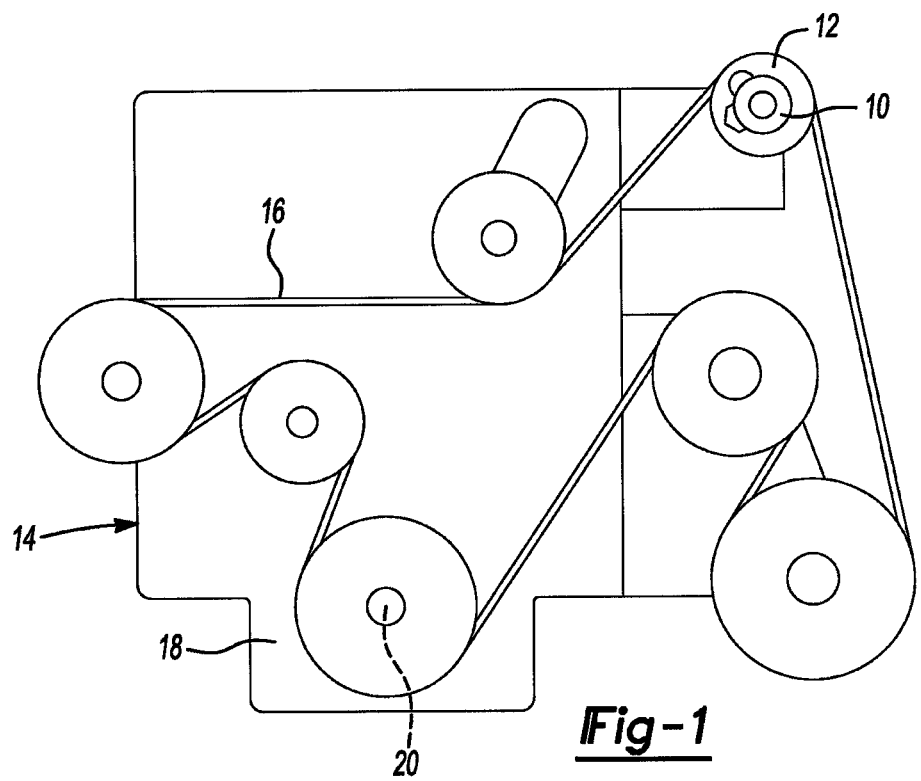
FIG. 1 is a schematic illustration of the front of an engine with a front engine accessory drive system that employs an over-running decoupler constructed in accordance with an embodiment of the present invention, the over-running decoupler being employed to transmit rotary power to an accessory.
Figure 2:
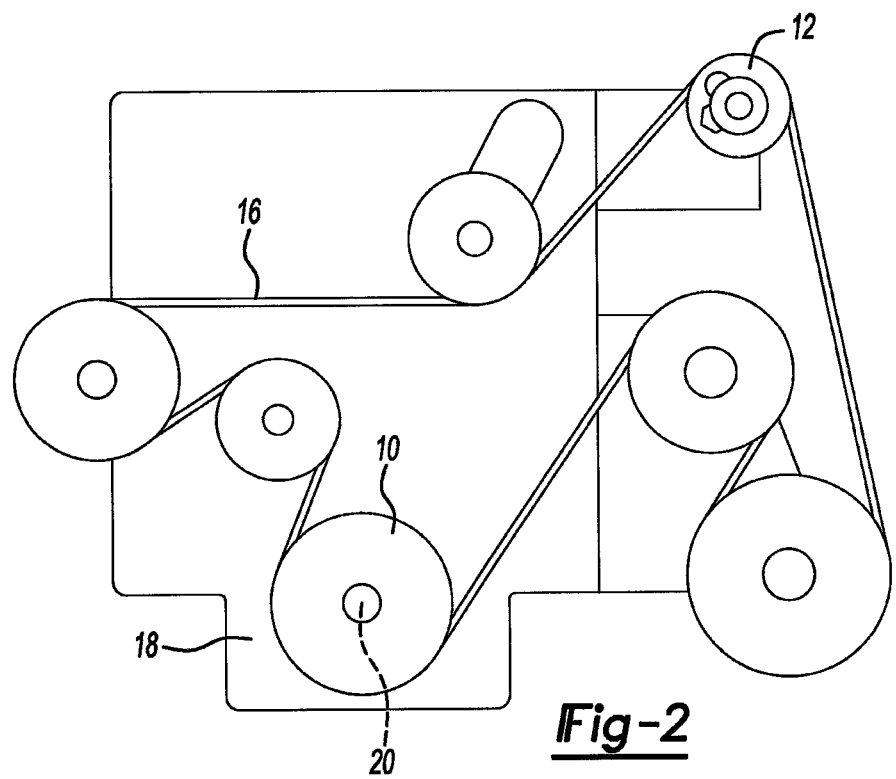
FIG. 2 is a schematic illustration of the front of an engine with a front engine accessory drive system that employs an over-running decoupler constructed in accordance with an embodiment of the present invention, the over-running decoupler being employed to transmit rotary power from the crankshaft of the engine to an endless power transmitting element.

With reference to FIG. 1 of the drawings, an over-running decoupler constructed in accordance with the teachings of the present disclosure is generally indicated by reference numeral 10. The particular over-running decoupler 10 illustrated is particularly suited for use with a driven device 12, such as an alternator or a supercharger, in a drive system 14 that employs an endless power transmitting element 16, such as a belt or a chain, from a source of rotary power 18, such as an engine or a transmission. Those of skill in the art will appreciate that the over-running decoupler 10 could be configured for use in another type of drive system (e.g., a drive system employing gears) and/or that the over-running decoupler 10 could be employed to transmit rotary power from a drive shaft 20 into the drive system as shown in FIG. 2. Accordingly, it will be appreciated that the teachings of the present disclosure have application in a crankshaft decoupler, similar to those which are disclosed in U.S. patent application Ser. Nos. 10/572,128 and 10/542,625, the disclosures of which are hereby incorporated by reference as if fully set forth in detail herein.

Figure 3:
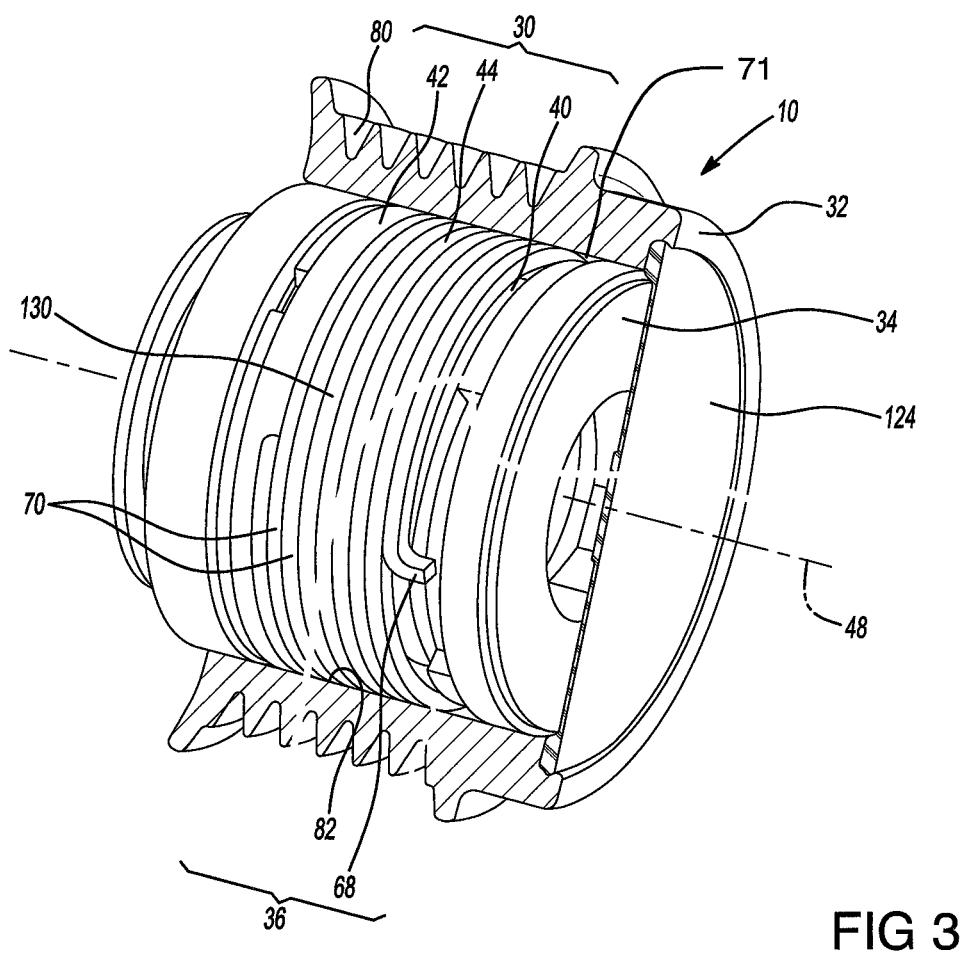
FIG. 3 is a perspective, partly cut-away view of the decoupler of FIG. 1, which shows wrap spring clutch that is included with the decoupler.
Figure 3A:
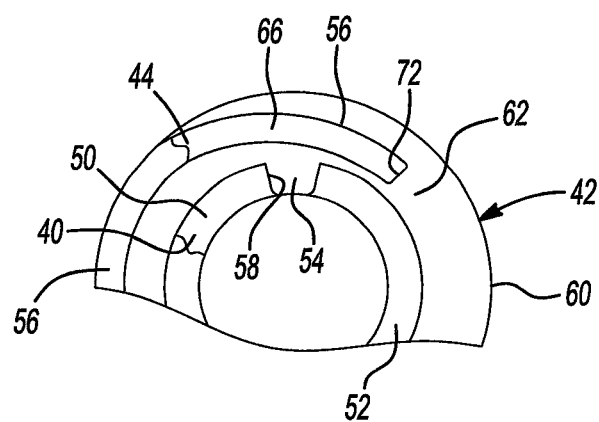
FIG. 3A is a partial plan view of a portion of the decoupler of FIG. 1, illustrating an exemplary configuration of a portion of a carrier for the wrap spring clutch shown in FIG. 3.
Figure 4:
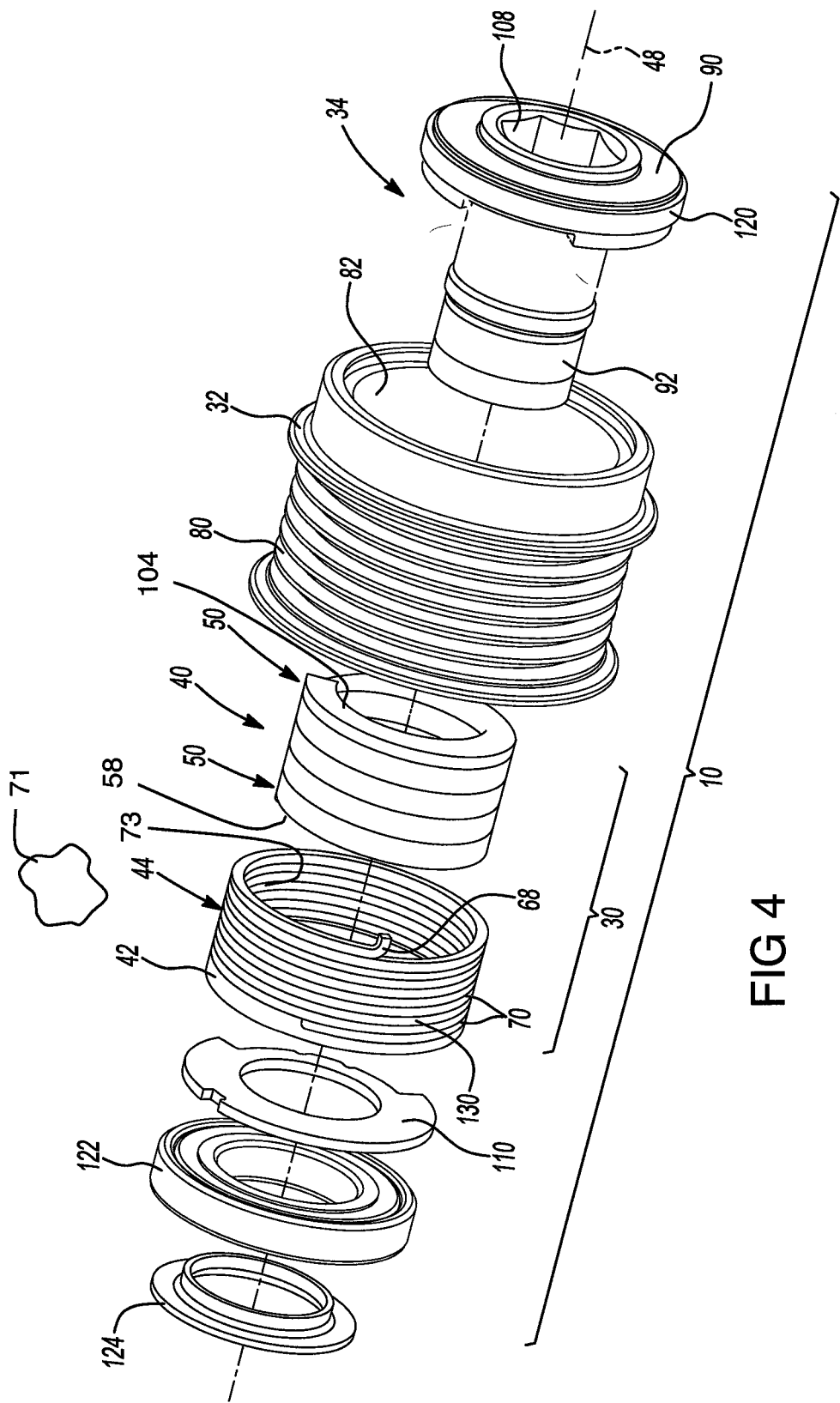
FIG. 4 is an exploded perspective view of the decoupler of FIG. 1.

With reference to FIGS. 3 and 4, the over-running decoupler 10 can include a decoupler input member 32, (which may, for example, be a pulley), a decoupler output member 34 (which may be a shaft-connection member and which may, for convenience be called a hub 34), a wrap spring clutch 44, a carrier 42 and an isolation spring 40. The input member 32 may, for convenience be referred to as a pulley 32, however, it will be understood that it may be any other suitable type of input member. The wrap spring clutch 44, the hub 34 and the pulley 32 can be configured in the manner described in U.S. patent application Publication Ser. Nos. 10/519,591 and/or 10/542,625, the contents of both of which are incorporated herein by reference.

The wrap spring clutch 44 transmits torque from the pulley 32 to the carrier 42. The isolation spring 40 is configured to torsionally resiliently couple the carrier 42 and the hub 34. In the particular example provided, the isolation spring 40 comprises a single helical torsion spring that is disposed concentrically about the rotary axis 48 of the over-running decoupler 10, but it will be appreciated that the isolation spring 40 could instead, for example, be one of two or more arcuate coil compression springs as disclosed in U.S. patent Publication Ser. No. 10/572,128 the contents of which are incorporated herein by reference.

The isolation spring 40 can be formed of an appropriate spring wire with a desired cross-sectional shape (e.g., round, square, rectangular) and can have ends that can be ground or unground. In the particular example provided the isolation spring 40 has closed ends 50 that are not ground.

Figure 5A:
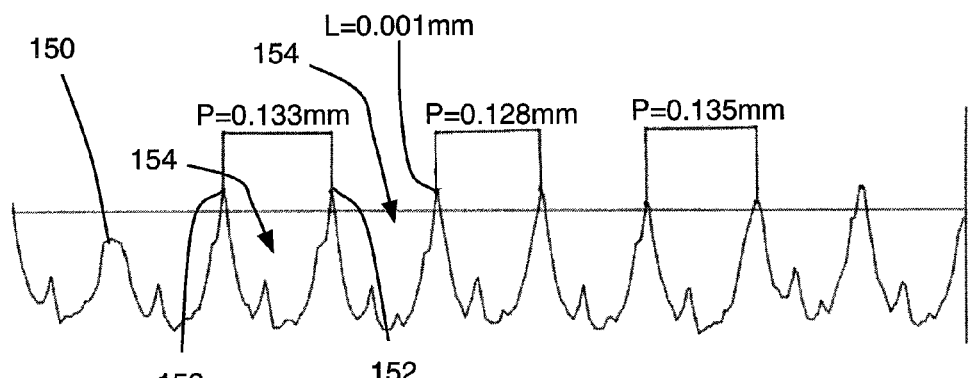
FIG. 5A is a profile of a prior art surface finish of a clutch engagement surface on a prior art decoupler.
Figure 5B:
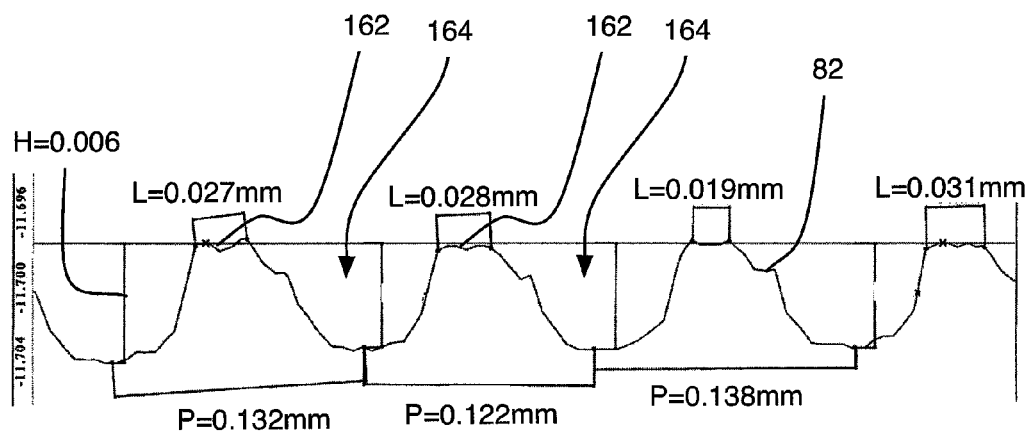
FIG. 5B is a profile of a surface finish of a clutch engagement surface on the decoupler shown in FIG. 1.

With reference to FIGS. 4 and 5, the carrier 42 can be torsionally coupled to the resilient isolation spring 40, as well as engaged to the wrap spring clutch 44. In the particular example provided, the carrier 42 comprises a helical raceway 52, which is configured to abut a corresponding one of the ends 50 of the isolation spring 40, an abutment 54, and a wrap spring clutch groove 56. The abutment 54 can be configured to abut an axial end face 58 of the wire that forms the isolation spring 40 when the end 50 of the isolation spring 40 is abutted against the helical raceway 52. The wrap spring clutch groove 56 can extend from an outer circumferential surface 60 of the carrier 42 into a radially interior portion of the carrier 42 and can terminate at a wrap spring clutch abutment 62.

The wrap spring clutch 44 can be formed of a spring wire material and can comprise a first end 66, a second end 68 and a plurality of helical coils 70 between the first and second ends 66 and 68. The spring wire material can have a desired cross-sectional shape, such as square, rectangular or round, and can be uncoated (i.e., bare) or coated with an appropriate plating and/or coating. Moreover, a lubricant shown at 71, such as a grease lubricant, can be employed on the helical coils 70 of the wrap spring clutch 44. The first end 66 can be received into the wrap spring clutch groove 56 in an axial direction and can cooperate with the wrap spring clutch groove 56 such that the first end 66 is retained to the carrier 42 in radial and circumferential directions. Moreover, an axial end 72 of the wire that forms the first end 66 can abut the wrap spring clutch abutment 62 so that rotary power may be transmitted between the carrier 42 and the wrap spring clutch 44 (i.e., from the carrier 42 to the wrap spring clutch 44 or from the wrap spring clutch 44 to the carrier 42) via contact between the wrap spring clutch abutment 62 and the helical end 72 of the wrap spring clutch 44. Because the carrier 42 engages the clutch 40 and more particularly the end of the clutch 40 that transmits torque into the isolation spring 40, the carrier 42 may be referred to as a clutch output member and the surfaces of the carrier 42 that engage the wrap spring clutch 44 may be referred to as output member clutch engagement surfaces. The wrap spring clutch 44 has a radially inner surface 73 and a radially outer surface 130. The radially outer surface 130 may also be referred to as an outer circumferential surface 130.

Returning to FIGS. 3 and 4, the decoupler input member 32 can have an external surface 80, which is shaped or otherwise configured to transmit rotary power in a particular drive system, and a radially inner surface 82. In the example provided, the decoupler input member 32 is a pulley with an external surface that is configured to engage a poly-vee belt, but it will be appreciated that the decoupler input member 32 could be configured with a different pulley configuration, or with the configuration of a roller, a friction roller, a sprocket or a gear, for example. The inner surface 82 can be sized to frictionally engage the radially outer surface 130 of the wrap spring clutch 44. Because in this example, the decoupler input member 32 engages the clutch 40, the decoupler input member 32 may also be referred to as the clutch input member 32 and the inner surface 82 may be referred to as an input member clutch engagement surface 82. In the particular example provided, the helical coils 70 of the wrap spring clutch 44 engage the inner surface 82 with an interference fit, in the sense that the coils 70 of the wrap spring clutch 44, when in a rest position, have an outer diameter that is larger than the inner diameter of the inner surface 82 of the pulley 32.

With reference to FIG. 4, the hub 34 can be torsionally coupled to the resilient isolation spring 40 and can include a head or flange portion 90 and a shank portion 92. In the particular example provided, the flange portion 90 comprises a helical raceway (not shown), which is configured to abut a corresponding one of the ends 50 of the isolation spring 40 and an abutment (not shown) that can be configured to abut an axial end face 104 of the wire that forms the isolation spring 40 when the end 50 of the isolation spring 40 is abutted against the helical raceway. The shank portion 92 can be configured to be coupled to an input member of a driven accessory 12 (FIG. 1) or to an output member 16 (FIG. 2) of a source of rotary power through any appropriate means, such as an interference fit, a mating spline or toothed geometry, threads, threaded fasteners, keys, etc., such that the hub 34 will rotate with the input member of the accessory or the output member of power source. The hub 34 may include one or more features that aid in the installation of the over-running decoupler 10, such as a hex recess 108 that can be employed to hold or turn the hub 34 relative to the input member of the accessory or the output member of power source. The shank portion 92 can be received through the one-way clutch 30 such that the carrier 42 is rotatably disposed thereon.

A thrust washer 110 can be fixedly coupled to the shank portion 92 to axially retain the one-way clutch 30 to the hub 34. In the particular example provided, the thrust washer 110 can also maintain the isolation spring 40 in an axially compressed state. The thrust washer 110 and the carrier 42 can be configured to cooperate with one another as is disclosed in U.S. Application Serial No. 10/581,097 to inhibit relative rotation between the helical raceway 52 (FIG. 4) of the carrier 42 and the corresponding end 50 of the isolation spring 40.

Bearings and/or bushings can be employed to rotatably support the decoupler input member 32 on the hub 34. In the particular example provided, a bushing 120 can be disposed between the flange portion 90 and the decoupler input member 32, while a sealed or unsealed bearing assembly 122 employing bearing balls or rollers can be disposed between the shank portion 92 and the decoupler input member 32. One or more seals or shields 124 can also be provided between the decoupler input member 32 and the shank portion 92 to inhibit the ingress of dust, debris and moisture into the interior of the over-running decoupler 10, as well as to inhibit the egress of any lubricant on the helical coils 70 of the wrap spring clutch 44 from the interior of the over-running decoupler 10.

With renewed reference to FIGS. 3 and 4, when rotary power is to be transmitted through the over-running decoupler 10, relative rotation between the decoupler input member 32 and the hub 34 in a first rotational direction tends to cause the wrap spring clutch 44 to uncoil such that its outer circumferential surface 130 grippingly engages the inner surface 82 of the decoupler input member 32 to thereby enable the transmission of rotary power through the over-running decoupler 10. If the rotational inertia of an object (i.e., the driven accessory in FIG. 1 or the drive system in FIG. 2) is sufficiently high to cause the hub 34 to overrun the input member 32 in the first rotational direction the wrap spring clutch 44 will tend to coil more tightly and thereby loosen its grip on the inner surface 82 of the pulley 32 such that the decoupler input member 32 and hub 34 may rotate at least somewhat independently of one another.

The inner surface 82 (i.e. the input member clutch engagement surface) has a selected surface finish. The surface finish of a typical, prior art clutch engagement surface 150 is shown in highly magnified form in FIG. 5A. The surface 150 may have been formed, for example, from a machining operation followed by a nitriding operation so as to form a relatively had surface layer. As can be seen, the surface 150 is generally made up of a plurality of peaks 152 separated by a plurality of valleys 154. The peaks 152 each have a width L that is, in some instances, about 0.001 mm, and the peak-to-peak pitch is shown at P and is, in some instances, on the order of about 0.13 mm. Some peaks 152 have been measured with a pitch P=0.128 mm, others have been measured with a pitch P=0.135 mm.

The applicant has discovered that the operating life of a decoupler can be extended by changing the surface finish on the clutch engagement surface. The clutch engagement surface 82 is shown highly magnified in FIG. 5B. The surface 82 has a surface finish that has a different profile than that shown in FIG. 5A. More specifically, the surface 82 has a plurality of peaks 162 separated by a plurality of valleys 164, however, the peaks 162 are generally in the form of plateaus that each have a width L that is larger than the width L of the peaks 152 on the surface 150 in FIG. 5A. The width L of the peaks 162 may, for example, be in the range of about 20 microns to about 300 microns wide. In the example shown in FIG. 5B, the widths W that were measured fell between 0.019 mm and 0.031 mm. The peaks 162 have a pitch P that may be, for example, between about 100 microns and about 400 microns. In the example shown in FIG. 5B, the pitch P has been measured between 0.122 mm and 0.138 mm. The peaks 162 have a height that may be generally uniform at about 0.006 mm from the floor of the valleys 164.

Figure 6A:
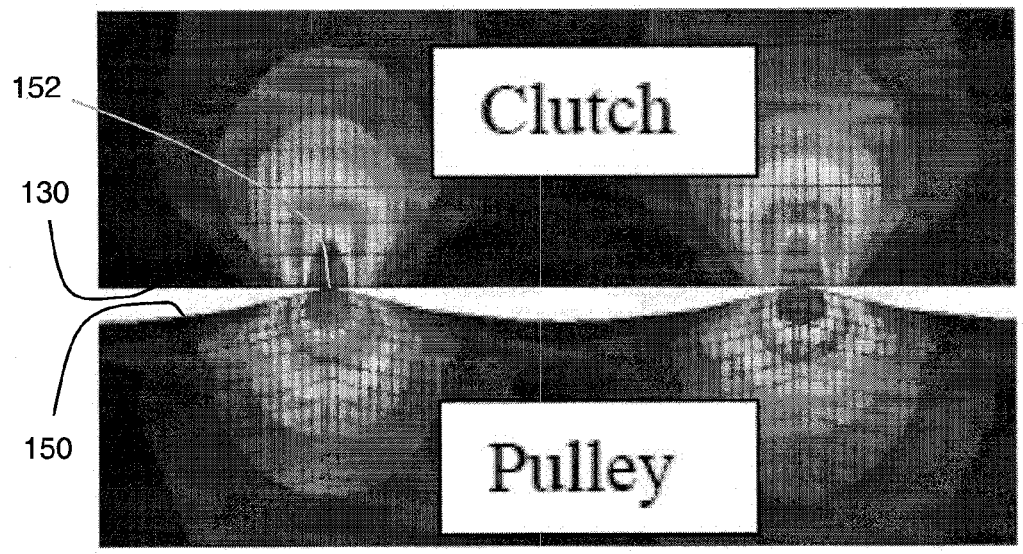
FIG. 6A is a finite element analysis of the profile of the prior art surface finish of the clutch engagement surface shown in FIG. 5A during engagement with a wrap spring clutch.
Figure 6B:
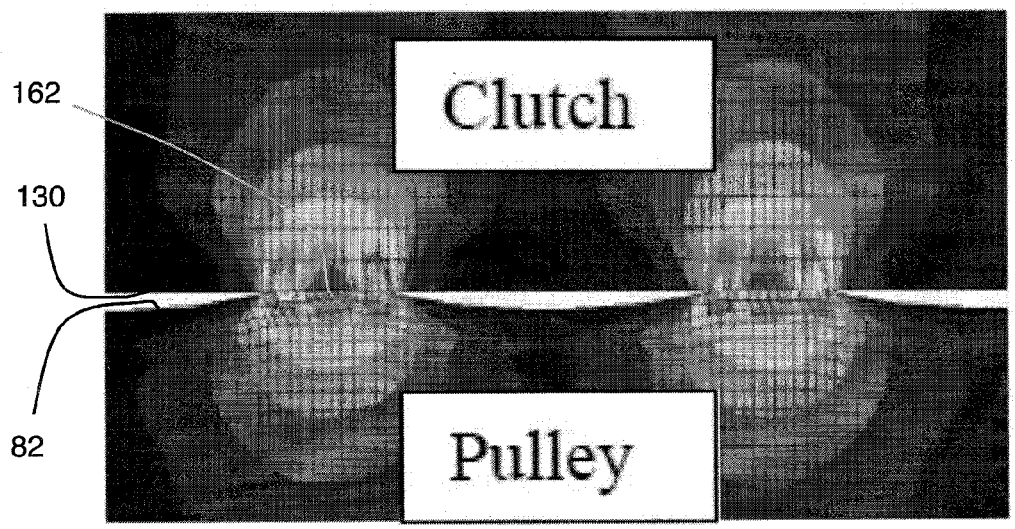
FIG. 6B is a finite element analysis of the profile of the surface finish of the clutch engagement surface shown in FIG. 5B during engagement with a wrap spring clutch.
Figure 7:
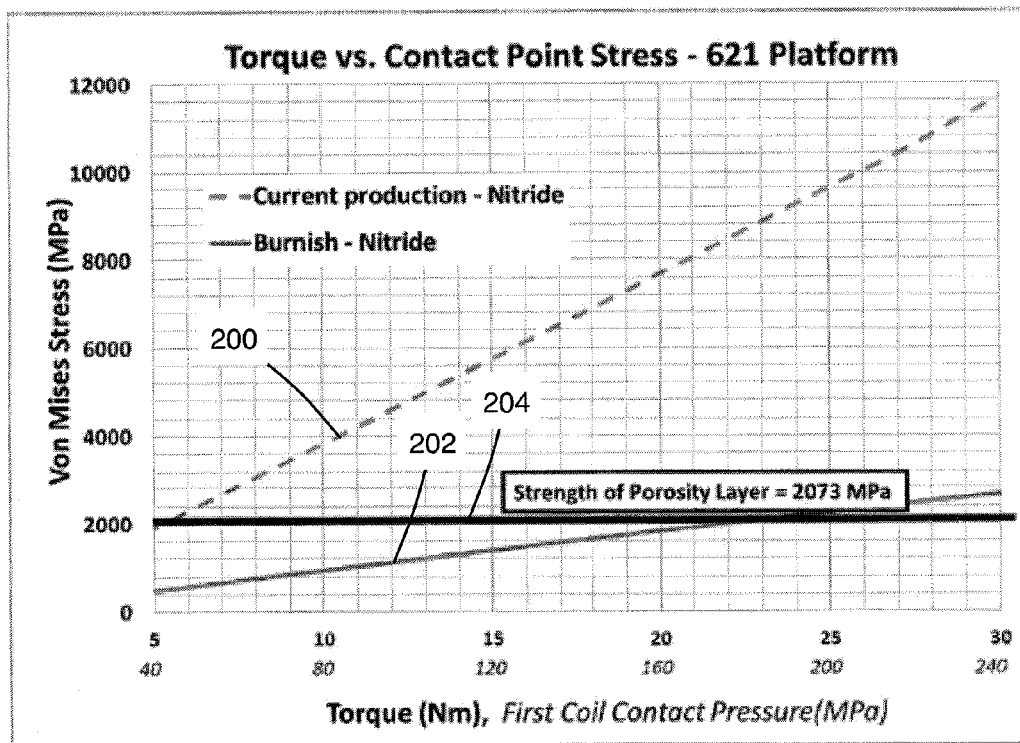
FIG. 7 is a graph comparing the contact stress that is incurred in the clutch engagement surface in relation to the torque being transferred between it and the wrap spring clutch, for both a prior art decoupler and the decoupler having the surface finish shown in FIG. 5B.
Figure 8:
FIG. 8 is a magnified sectional view of the clutch engagement surface formed from steel that has been nitrided.

By providing the relatively wide peaks 162 the surface area of contact between the clutch engagement surface 162 and the outer surface 130 of the wrap spring clutch 44 is enlarged as compared to the surface area of engagement of the clutch engagement surface 150. Several advantages arise from this. FIGS. 6A and 6B show finite element analyses of the contact stresses that are incurred by the pulley 32 and the wrap spring clutch 44 as a result of their engagement. The contact stresses for the case shown in FIG. 6A (in which the clutch engagement surface 150 engages the wrap spring clutch 44) are higher than those for the case shown in FIG. 6B (in which the clutch engagement surface 82 engages the wrap spring clutch 44). FIG. 7 shows the relationship between the torque transmitted between the pulley 32 and the wrap spring clutch 44 and the stresses incurred by the inner surface of the pulley. Curve 200 shows the relationship for the case where the inner surface 150 of a prior art pulley engages the wrap spring clutch 44. Curve 202 shows the relationship for the case where the inner surface 82 of the pulley 32 engages the wrap spring clutch 44. A cross-section of the material is shown in FIG. 8. As mentioned above, the material, which may be a suitable steel such as JIS G4051 S25C, has been gas nitrided so as to have a surface hardened layer shown at 210 on top of a base shown at 212. The surface hardened layer 210 may itself comprise a porous layer shown at 214 and a white layer 216 underneath the porous layer 214. The porous layer may have a hardness value that is higher than that of the base (e.g. 671 HV v. 390 HV), however, the white layer 216 has a higher hardness value (910 HV). The porous layer 214, while being strong and hard, may be brittle and may have relatively low ductility. As a result, when the porous layer 214 incurs stresses that exceed its yield strength, there is a high likelihood of particles breaking off, instead of the layer plastically deforming under the load. These particles then contaminate the lubricant that is used between the wrap spring clutch 44 and the inner surface 150 or 82 and act as an abrasive to further wear the inner surface 150 or 82. Continued wear of the inner surface 82 or 150 leads to eventual failure of the decoupler 10.

Given the brittleness of the porous layer 214, it is advantageous to keep stresses incurred by it below its yield strength. The yield strength of the porous layer 214 may be, in some cases, about 2100 MPa, as shown in FIG. 7 by line 204. Referring to FIG. 7, the curve 200 shows that the contact stresses quickly increase past the yield strength of the porous layer 214 as the torque increases. For example, at a little over 5 Nm of torque between the clutch engagement surface 150 and the wrap spring clutch 44, the contact stresses are already at about the yield strength of the porous layer 214. By contrast, curve 202 shows that the contact stresses do not exceed the yield strength of the porous layer 214 until about 22.5 Nm of torque are being transferred. Thus, a broader range of operating conditions of an engine 18 may be experienced without causing stresses that are above the yield strength of the porous layer 214 when using the surface finish for surface 82, than when using the surface finish for surface 150. Accordingly, over time, there may be less contamination of the lubricant from particles that have broken away from the porous layer 214 using the clutch engagement surface 82 than would occur using the clutch engagement surface 150.

When determining the surface finish to use for a particular decoupler, an expected torque that the decoupler is expected to transfer may first be determined. Using the expected torque, the minimum width of the peaks 162 that would be needed to keep the contact stresses below the yield strength of the material may be determined (e.g. using finite element analysis). By keeping the width L of the peaks above the minimum width, it can be expected that relatively little contamination of the lubricant will take place. In a particular example, a decoupler may be expected to transfer 30 Nm of torque (during engine startup events), while the expected torque transferred during idle conditions may be expected to be less than about 10 Nm of torque. In some instances, the decoupler 10 may be designed with a focus on handling stresses associated with idle conditions, since idle conditions make up about 40% of a city duty cycle for an engine. In such a case, in order to keep contact stresses below the yield strength of the porous layer 214, peaks 162 having a width L of about 20 microns (or more) may be used. If the decoupler 10 is designed with a focus on keeping stresses below the yield strength of the material even during events that cause the maximum torque transfer to occur, such as the above noted engine startup event, then the peaks 162 would require a width L of about 40 microns (or more) in order to keep stresses below the yield strength of the porous layer 214. In either case described above the width of the peaks 162 is designed based at least in part on the yield strength of the material that makes up the clutch engagement surface 82.

It will be noted that the width L of the peaks 162 need not be selected so that the contact stresses always remain below the yield strength of the porous layer. In some embodiments, the width L of the peaks 162 may be selected so that under certain operating conditions (e.g. at idle), the contact stresses will be below the yield strength, whereas under less frequent operating conditions (e.g. upon engine startup) the contact stresses will be permitted to exceed the yield strength of the clutch engagement surface 82. An example of such a case is shown by curve 202 in FIG. 7.

It will be noted that, in general, as the decoupler increases in size (e.g. to accommodate a larger alternator shaft), the minimum peak width L that will be needed will increase due to an expectation that the clutch surface pressures will increase, since the clutch surface pressure is directly related to the alternator drive torque).

Another consideration, aside from direct mechanical wear on the clutch engagement surface 82 and contamination of the lubricant, is the temperature of the lubricant. In particular, as the temperature of the lubricant increases it can degrade (e.g. by oxidation) and lose its ability to lubricate the wrap spring clutch 44 and the clutch engagement surface 150 or 82. Some lubricants are designed to be thermally and oxidatively stable over a certain temperature range, such that they degrade particularly when they are exposed to temperatures above that range.

During sliding movement between the wrap spring clutch 44 and the clutch engagement surface 150 or 82, a rise in the surface temperature will be experienced locally (i.e. within the region of the peaks 152 or 162 and within any analogous peaks on the outer surface 130 of the wrap spring clutch 44). This may be referred to as the flash temperature. The rise in temperature of the surfaces 130 and 150 or 82 is conducted into the local volume of lubricant that is nearby. The greater the temperature rise, the more degradation that will be incurred by the lubricant.

The temperature rise of the lubricant during sliding engagement between the wrap spring clutch 44 and the clutch engagement surface 150 or 82 is inversely proportional to the size of the peaks 152 or 162. The relationship may be approximated using the formula:

$$(T - T_0) = \frac{fWV}{4r(k1 + k2)}$$

where:
f=coefficient of friction between the two surfaces of interest (e.g. surface 130 and surface 150 or 82)
W=load (i.e. the normal force exerted between the two surfaces)
V=sliding velocity between the two surfaces
r=radius of asperity (i.e. ½ of the width of the peak)
k1, k2=thermal conductivities of the two surfaces Table 1 below illustrates the difference in the temperature rise that can occur when engaging the wrap spring clutch 44 with the surface 150 and with the surface 82. In the example shown in the table, the width L used for the peaks 152 is 0.002 mm, while the width L used for the peaks 162 is 0.060 mm.

TABLE 1

Comparison of temperature rise during use
Temperature Rise due to Sliding - Various Pulley Manufacturing Techniques

| Pulley Bone | Normal Load from 621 Clutch (N) | Asperity Contact Radius (m) | Thermal Conductivity-Pulley (W/m° C.) | Thermal Conductivity-clutch (W/m° C.) | Thermal diffusivity-Pulley | Thermal diffusivity-clutch | Velocity of clutch (m/s) | Coefficient of friction | Temperature Rise (° C.) |
|---|---|---|---|---|---|---|---|---|---|
| Prior Art (Surface 150) | 260 | 0.000001 | 30 | 54 | 9.142E−10 | 1.474E−05 | 0.0026 | 0.12 | 241 |
| Surface 82 | 260 | 0.000030 | 30 | 54 | 9.142E−10 | 1.474E−05 | 0.0026 | 0.12 | 8 |

5 to 15 Nm of torque using Clutch FEA for distance, then 20 Hz firing frequency to get the Velocity of the clutch (130 microns of movement per engine pulse)

As can be seen from Table 1 above, when using peaks that have a width of 0.002 mm, there is a local temperature rise of 241 degrees Celsius. When using peaks that have a width of 0.06 0mm, there is a local temperature rise of 8 degrees Celsius. When using peaks 152 having widths of 0.001 mm and peaks 162 having widths of 0.030 as shown, the temperature rises that can be expected are 482 degrees Celsius and 16 degrees Celsius respectively. An example of a lubricant that can be used in some decouplers and in the decoupler 10 is Petro-Canada Peerless LLG grease. This grease has a working range of temperatures that is between −35 and 200 degrees Celsius. Above this temperature range the grease is particularly subject to oxidation. Thus, there is more oxidation that will occur in the lubricant when using surface 150 than would take place when using surface 82. In other embodiments, other types of grease may be used which have different working ranges of temperature. In many cases, however, the flash temperature of the peaks 152 would exceed the working range of the grease, thereby causing oxidation of the grease.

Thus, when determining the surface finish to use for a particular decoupler, the working temperature range for the lubricant may be determined, and the minimum width of the peaks 162 that would be needed to keep the sliding contact between the wrap spring clutch 44 and the surface 82 from generating flash temperatures that would exceed the working range may be determined (e.g. using the formula provided above).

In a preferred embodiment, the minimum width for the peaks 162 may be determined with respect to lubricant temperature and with regard to yield strength, and the selected width for the peaks 162 may be selected to be at least as large as larger of the two minimum widths.

Figure 9:
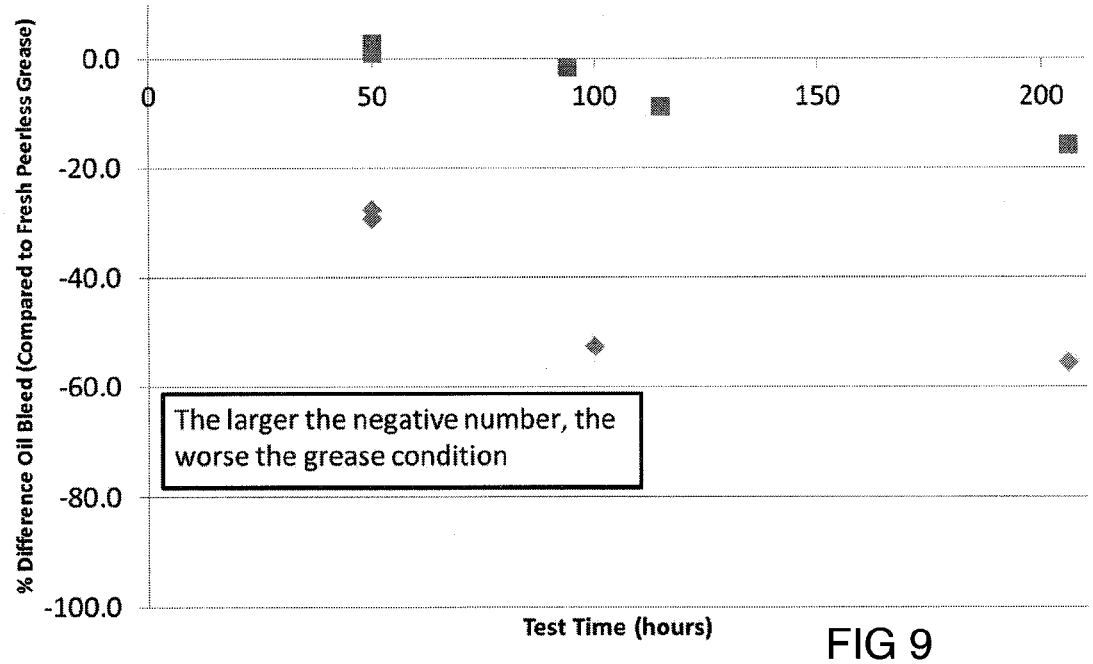
FIG. 9 is a graph based on an oil bleed analysis comparing the degradation of grease used in a decoupler having a prior art surface finish and the decoupler having the surface finish shown in FIG. 5B.

Tests were conducted on two different decouplers, one using the prior art clutch engagement surface 150 on one using the clutch engagement surface 82 and using a particular grease as the lubricant (e.g. the grease described above). The results of an oil bleed analysis done after different test periods are shown in the graph in FIG. 9. In the graph the diamond-shaped points on the graph represent the degradation in the lubricant when using the surface 150 and where the square-shaped points represent the degradation using the surface 82. As can be seen, after 50 hours of use, the grease when using the surface 82 is essentially undegraded as compared to fresh grease. By contrast, there was about a 30% degradation in the grease when using the prior art surface 150. After 100 hours, the grease is still essentially undegraded when using the surface 82, but there is about a 50% degradation when using the prior art surface 150.

Figure 10:
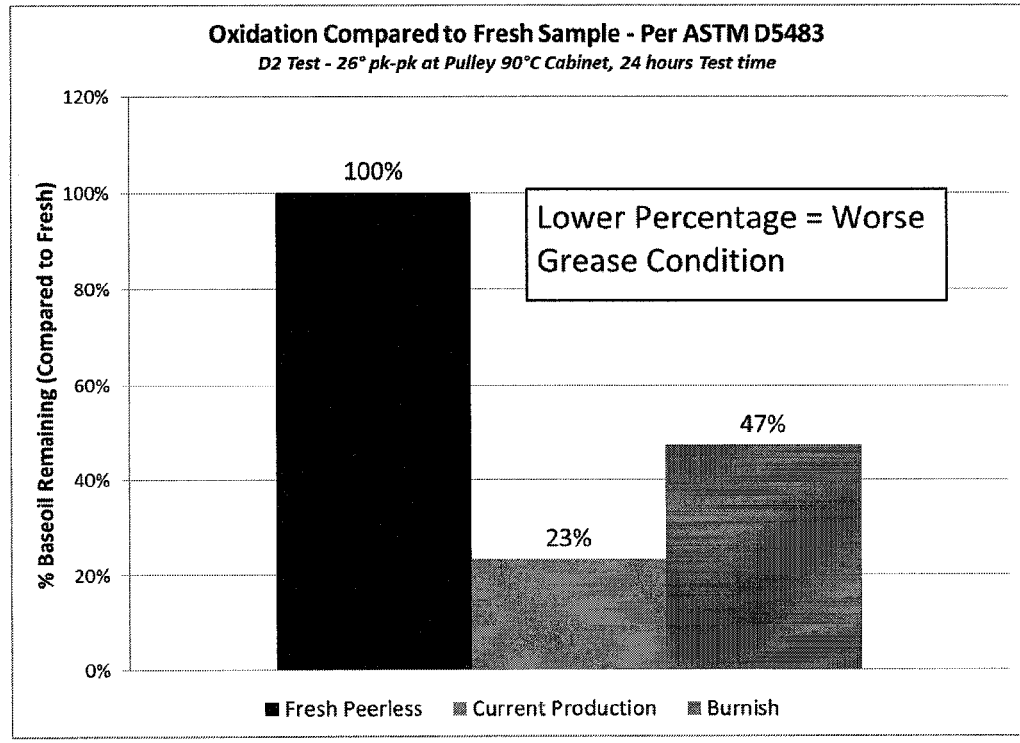
FIG. 10 is a histogram based on an oxidation burn comparing the degradation of grease used in a decoupler having a prior art surface finish and the decoupler having the surface finish shown in FIG. 5B.

Other test results are shown in FIG. 10. These results show that, after a period of operation of a test decoupler there was only 23% base oil (i.e. oil that was not oxidized) remaining when the prior art clutch engagement surface 82 was used, but there was about twice as much (47%) base oil remaining when the clutch engagement surface 82 was used.

As evidenced by the test results described above, in general, providing the surface finish of surface 82 results in a reduced amount of degradation and contamination of the lubricant over time, which itself results in less wear on the inner surface 82 than would occur with a prior art surface finish. Additionally, aside from the issue of contamination and oxidation of the lubricant, there is less direct wear that occurs on the surface 82 from engagement with the wrap spring clutch 44, since there are fewer (if any) events that cause a contact stress that exceeds the yield strength of the porous layer 214. This results in a longer operating life for the clutch engagement surface 82 as compared to some prior art surfaces which in turn can result in a longer operating life for the decoupler 10 (or other clutched device).

It has been found that, above a certain width L of the peaks 162, there is an increased risk of slipping between the wrap spring clutch 44 and the surface 82 during engagement. It is theorized that this slippage occurs because there is not sufficient room for the grease to move out of the way when the surfaces 130 and 82 engage each other to effect torque transfer. Thus, a sort of hydroplaning effect can occur. It has been found to be beneficial for there to be valleys 164 between the peaks 162 and for the valleys 164 to be sufficiently large dimensionally to accommodate the grease as needed so that the clutch 44 and the clutch engagement surface 82 can engage and grip each other without undue slippage. It has been found that it is preferable to have peaks 162 that have a width of between about 20 microns and about 300 microns, and valleys 164 between the peaks 162 yielding a peak-to-peak pitch of about 100 to about 400 microns. The valleys 164 have a depth of between about 3 microns and about 15 microns, (e.g. about 6 microns). The ratio of the width of each peak 162 to a width of each valley 164 adjacent each peak 162 is between about 0.2:1 and about 3:1.

It may be possible to provide larger peak widths L, while also providing larger valleys to receive the grease.

Any suitable operation may be carried out to achieve the surface finish for surface 82. For example, a roller burnishing operation may be used. The sequence of operations then, that may be used to provide the selected surface finish includes: machining the pulley 32, roller burnishing the pulley bore (i.e. surface 82), heat treating (i.e. nitriding) and e-coating (wherein, for example, the pulley 32 is dipped in a vessel containing a coating, and is electrified to promote adhesion of the coating to its surface).

Alternatively, a diamond burnishing operation may be used, wherein the sequence of operations may be: machining the pulley bore (i.e. the inner surface 82 of the pulley 32), using a diamond burnishing tool to provide the surface finish on the inner surface 82, machining the outer surface features (e.g. the V-grooves), heat treating and e-coating. It has been found that the best results are obtained when the machining of the pulley bore results in a surface roughness (Rz) of between 8 and 20 microns. This permits the peaks that result from the machining step to be plastically deformed to a flattened state to obtain the peaks 162 shown in FIG. 5b, while still retaining sufficient valley depth and width for grease to move out of the way when the wrap spring clutch 44 engages the surface 82. Diamond burnishing is advantageous as compared to roller burnishing in that, if desired, only a small section of the pulley bore can be burnished. For example, if desired, only the portion of the pulley bore that will engage the wrap spring clutch can be burnished, or, in an even more targeted manner, only the highest pressure portion of the clutch engagement portion of the pulley bore can be burnished.

It will be noted that the burnishing described herein is not intended simply to provide as smooth a surface finish as possible. Rather it is to obtain a surface finish that has both peaks in the form of plateaus that have a selected range of widths separated by valleys that have sufficient dimensions to receive enough grease to permit the wrap spring clutch 44 to properly engage and grip the clutch engagement surface 82 without hydroplaning.

The orientation of the peaks 162 is a direct result of the manufacturing process used to create them. It has been found that, in general, a helical orientation of the peaks 162 is achieved and works successfully. The helical orientation results because the burnishing operation generally follows and flattens out the peaks that exist from the machining operation. The machining operation typically takes place on a CNC lathe and thereby produces helically oriented peaks. It will be noted that the peaks are oriented in the same direction generally as the direction of movement between the wrap spring clutch 44 and the clutch engagement surface 82. More particularly, the peaks 162 are oriented in a generally helical direction, and the direction of movement between the wrap spring clutch 44 and the clutch engagement surface 82 is circumferential.

Figure 11:
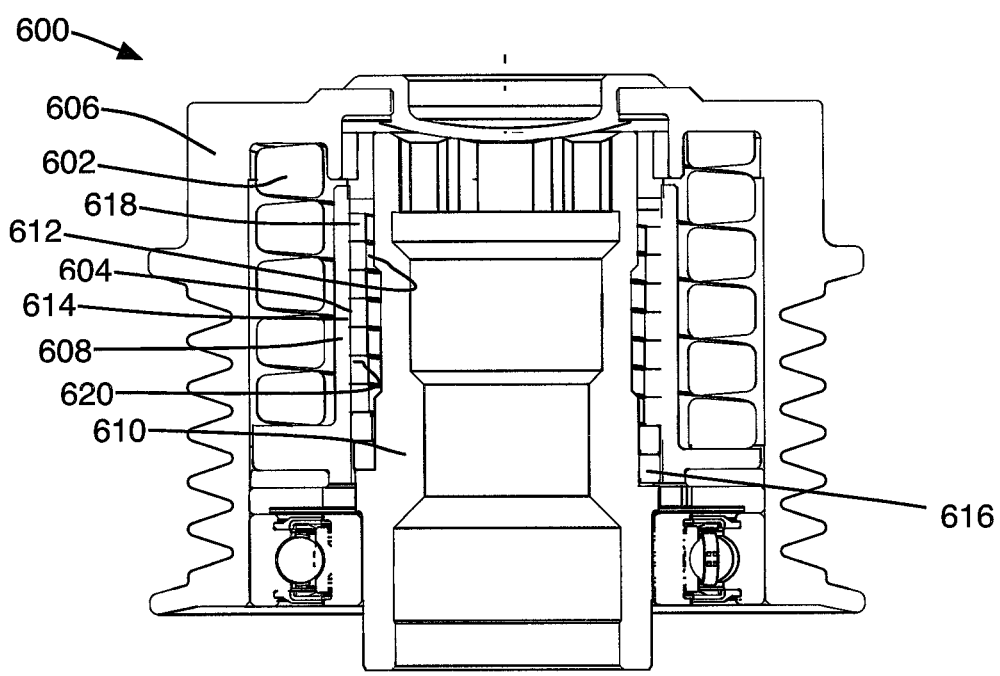
FIG. 11 is a sectional side view of another decoupler constructed in accordance with an embodiment of the present invention.

Reference is made to FIG. 11 which shows a section view of another decoupler 600, in which the isolation spring, shown at 602 is positioned outboard of the wrap spring clutch, shown at 604. The decoupler 600 further includes a decoupler input member 606 (e.g. a pulley) which engages one end of the isolation spring 602, a sleeve 608 which engages the other end of the isolation spring 602, and decoupler output member 610. The wrap spring clutch 604 has a radially inner surface 612 and a radially outer surface 614 and a first end 616 and a second end 618. Torque is transferred into the clutch 604 from the sleeve 608 by engagement of an inner surface 620 of the sleeve 608 with the radially outer surface 614 of the clutch 604. Torque is transferred from the clutch into the decoupler output member 610 by engagement of the first end 616 with a drive face (not shown) on the decoupler output member 610. Thus, the sleeve 608 may be considered to be a clutch input member and the inner surface 620 of the sleeve 608 may be considered to be the input member clutch engagement surface. Similarly, the decoupler output member 610 may be considered to be the clutch output member, and the surfaces on the decoupler output member 610 that engage the clutch 604 may be considered to be output member clutch engagement surfaces.

The clutch engagement surface 620 on the sleeve 608 may be provided with the surface finish described above for the clutch engagement surface 82.

While the embodiments shown in FIGS. 1-11 are decouplers it will be understood the surface finish described for surfaces 82 and 620 may be applied to other clutched devices that include a wrap spring clutch, a clutch input member and a clutch output member.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A clutched device, comprising:
   a clutch input member;
   a clutch output member;
   a wrap spring clutch that is engageable with the clutch input member and the clutch output member and which has a radially outer surface and a radially inner surface, wherein one of the radially outer and inner surfaces is engageable with a clutch engagement surface on one of the clutch input member and the clutch output member; and
   a volume of lubricant positioned to lubricate the wrap spring clutch and the clutch engagement surface,
   wherein the clutch engagement surface has a surface finish that includes a plurality of peaks and valleys, wherein the peaks engage the wrap spring clutch and each have a selected width that is based at least in part on one or more properties selected from: a yield strength of a material making up the clutch engagement surface; and a working range of temperatures of the lubricant.

2. A clutched device as claimed in claim 1, wherein the selected width of the peaks is selected such that, over a selected range of torques to be transferred through the clutched device, contact stresses incurred by the clutch engagement surface are below the yield strength of the material.

3. A clutched device as claimed in claim 2, wherein the clutch engagement surface is made from a steel that is nitrided.

4. A clutched device as claimed in claim 1, wherein the selected width of the peaks is selected such that a local temperature rise in the peaks that takes place during sliding contact between the wrap spring clutch and the clutch engagement surface is sufficiently low to keep the lubricant within the working range of temperatures.

5. A clutched device as claimed in claim 4, wherein the peaks have a peak-to-peak a pitch of about 100 to about 400 microns.

6. A clutched device as claimed in claim 4, wherein the peaks each have a height of about 3 to about 15 microns.

7. A clutched device as claimed in claim 1, wherein the selected width of the peaks is between about 20 and about 300 microns.

8. A clutched device as claimed in claim 1, wherein the clutch engagement surface is an inner surface of the clutch input member that engages a radially outer surface of the wrap spring clutch.

9. A clutched device as claimed in claim 1, wherein the selected width of the peaks is between about 20 and about 300 microns, the peaks have a peak-to-peak pitch of about 100 to about 400 microns, the peaks each have a height of about 3 to about 15 microns, and the ratio of the width of each peak to a width of each valley adjacent each peak is between about 0.2:1 and about 3:1.

10. A decoupler, comprising:
    a decoupler input member;
    a decoupler output member;
    a wrap spring clutch and an isolation spring that act in series in a torque path between the decoupler input member and the decoupler output member, wherein the wrap spring clutch has a radially inner surface and a radially outer surface, wherein at least one of the radially inner and outer surfaces engages a clutch engagement surface of the decoupler; and
    a volume of lubricant positioned to lubricate the wrap spring clutch and the clutch engagement surface,
    wherein the at least one clutch engagement surface has a surface finish that includes a plurality of peaks and valleys, wherein the peaks engage the wrap spring clutch and each have a selected width that is based at least in part on one or more properties selected from: a yield strength of a material making up the at least one clutch engagement surface; and a working range of temperatures of the lubricant.

11. A decoupler as claimed in claim 10, wherein the clutch engagement surface is on the decoupler input member.

12. A decoupler as claimed in claim 10, further comprising a sleeve positioned to receive torque from the isolation spring and to transmit torque to the wrap spring clutch and wherein the clutch engagement surface is on the sleeve.

13. A decoupler as claimed in claim 10, wherein the selected width of the peaks is selected such that, over a selected range of torques to be transferred through the clutched device, contact stresses incurred by the clutch engagement surface are below the yield strength of the material.

14. A decoupler as claimed in claim 13, wherein the clutch engagement surface is made from a steel that is nitrided.

15. A decoupler as claimed in claim 10, wherein the selected width of the peaks is selected such that a local temperature rise in the peaks that takes place during sliding contact between the wrap spring clutch and the clutch engagement surface is sufficiently low to keep the lubricant within the working range of temperatures.

16. A decoupler as claimed in claim 15, wherein the peaks have a peak-to-peak a pitch of about 100 to about 400 microns.

17. A decoupler as claimed in claim 15, wherein the peaks each have a height of about 3 to about 15 microns.

18. A decoupler as claimed in claim 10, wherein the selected width of the peaks is between about 20 and about 300 microns.

19. A decoupler as claimed in claim 10, wherein the clutch engagement surface is an inner surface of the clutch input member that engages a radially outer surface of the wrap spring clutch.

20. A clutched device as claimed in claim 10, wherein the selected width of the peaks is between about 20 and about 300 microns, the peaks have a peak-to-peak pitch of about 100 to about 400 microns, the peaks have a height of about 3 to about 15 microns, and the ratio of the width of each peak to a width of each valleys adjacent each peak is between about 0.2:1 and about 3:1.

* * * * *